(12) United States Patent
Karbassi et al.

(10) Patent No.: US 6,874,377 B2
(45) Date of Patent: Apr. 5, 2005

(54) SENSOR PACKAGE FOR FLUSH MOUNTING OF A SENSOR

(75) Inventors: Said Karbassi, Monroe, WI (US); D. Joseph Maurer, Pearl City, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/437,418

(22) Filed: Nov. 10, 1999

(65) Prior Publication Data

US 2003/0019300 A1 Jan. 30, 2003

(51) Int. Cl.⁷ .................................................. G01L 1/00
(52) U.S. Cl. ...................................... 73/862.381; 73/862
(58) Field of Search ........................... 73/724, 706, 862, 73/862.381, 862.541, 756, 517, 718; 338/2, 42

(56) References Cited

U.S. PATENT DOCUMENTS

| | | | |
|---|---|---|---|
| 3,095,551 A | 6/1963 | Hebert | 338/5 |
| 3,863,192 A * | 1/1975 | Grey | 338/2 |
| 3,880,145 A | 4/1975 | Blick | 128/2.05 A |
| 4,209,776 A * | 6/1980 | Frederick | 340/541 |
| 4,355,692 A | 10/1982 | Ostrelich | 177/211 |
| 4,411,160 A * | 10/1983 | Lutenegger et al. | 73/843 |
| 5,130,500 A * | 7/1992 | Murakami et al. | 178/18.08 |
| 5,184,107 A * | 2/1993 | Maurer | 338/42 |
| 5,257,547 A * | 11/1993 | Boyer | 73/756 |
| 5,353,003 A | 10/1994 | Maurer | 338/47 |
| 5,965,821 A * | 10/1999 | Grudzien | 73/724 |
| 5,996,419 A * | 12/1999 | Sokn | 73/706 |
| 6,040,625 A * | 3/2000 | Ip | 257/719 |

FOREIGN PATENT DOCUMENTS

| | | | |
|---|---|---|---|
| DE | 43 40 565 | 6/1995 | |
| DE | 197 25 717 | 2/1999 | |
| EP | 0 207 579 | 1/1987 | |
| EP | 0 561 397 | 9/1993 | |
| EP | 0 779 503 | 6/1997 | |
| EP | 0779503 A2 * | 6/1997 | G01J/5/04 |

OTHER PUBLICATIONS

Meriam Webster's Collegiate Dictionary (1997) Meriam–Webster Inc. USA. p. 1174.*

International Search Report in International (PCT) Application No. PCT/US00/30827, dated Mar. 5, 2001.

* cited by examiner

Primary Examiner—Edward Lefkowitz
Assistant Examiner—Lilybett Martir
(74) Attorney, Agent, or Firm—Kris T. Fredrick

(57) ABSTRACT

A sensor package having a force sensing element and a housing. The force sensing element has an element surface, a well, a first and second shelves within the well. The housing has a housing surface. The first and second shelves of the housing are arranged to support the force sensing element so that the element surface and the housing surface are substantially coplanar and so that the element surface of the force sensing element directly senses a force without need of an actuator.

22 Claims, 3 Drawing Sheets

SENSOR PACKAGE FOR FLUSH MOUNTING OF A SENSOR

TECHNICAL FIELD OF THE INVENTION

The present invention relates to a package for the support of a sensor such as a solid state force sensor.

BACKGROUND OF THE INVENTION AND PRIOR ART

Typical low cost solid state force sensors mount a sensing element in an external package. The sensing element is attached to an actuator that extends outside of the housing and that communicates an external force to the sensing element within the housing.

The actuator in this type of construction can negatively affect the performance and accuracy of the sensor. For example, the construction tolerances of the sensor, of the sensor mounting system, and of the actuator can result in the actuator having an improper position with respect to the sensing element. Improper positioning of the actuator can in turn lead to sensing errors.

The present invention eliminates the need for an actuator by providing a sensor package that mounts the sensing element in a planar orientation so that the sensing element can interact directly with the force that it is intended to sense. This mounting arrangement, therefore, eliminates the performance errors and sensitivity loss associated with the sensors that use some form of actuator interface between the sensing element and the force that is sensed.

Also, the sensing element of the present invention may have a flat, planar surface so that it can better interface with certain compliant materials such as human skin. Conventional force sensors typically cannot maintain a flat surface across the surface of a force sensor package. Moreover, the sensor package of the present invention has a simple construction and has few components resulting in a relatively low manufacturing cost, it is relatively simple to automate, and it can be made relatively thin for greater accuracy.

SUMMARY OF THE INVENTION

In accordance with one aspect of the present invention, a sensor package comprises a force sensing element and a housing. The force sensing element has an element surface. The housing has a housing surface. The housing is arranged to support the force sensing element so that the element surface and the housing surface are substantially coplanar and so that the element surface of the force sensing element directly senses a force without need of an actuator.

According to another aspect of the present invention, a sensor package comprises a force sensing element and a housing. The force sensing element has an element surface. The housing has a housing surface, a well, and first and second shelves within the well. The first and second shelves of the housing are arranged to support the force sensing element so that the element surface and the housing surface are substantially coplanar and so that the element surface of the force sensing element directly senses a force without need of an actuator.

According to yet another aspect of the present invention, a method of packaging a sensing element having an element surface comprises the following steps: a) applying the sensing element to a housing having a housing surface so that the element surface and the housing surface are substantially coplanar; and, b) attaching the sensing element to the housing.

BRIEF DESCRIPTION OF THE DRAWINGS

The features and advantages of the present invention will become more apparent from a detailed consideration of the invention taken in conjunction with the drawings in which.

DESCRIPTION OF THE PREFERRED EMBODIMENT

Figure 1:
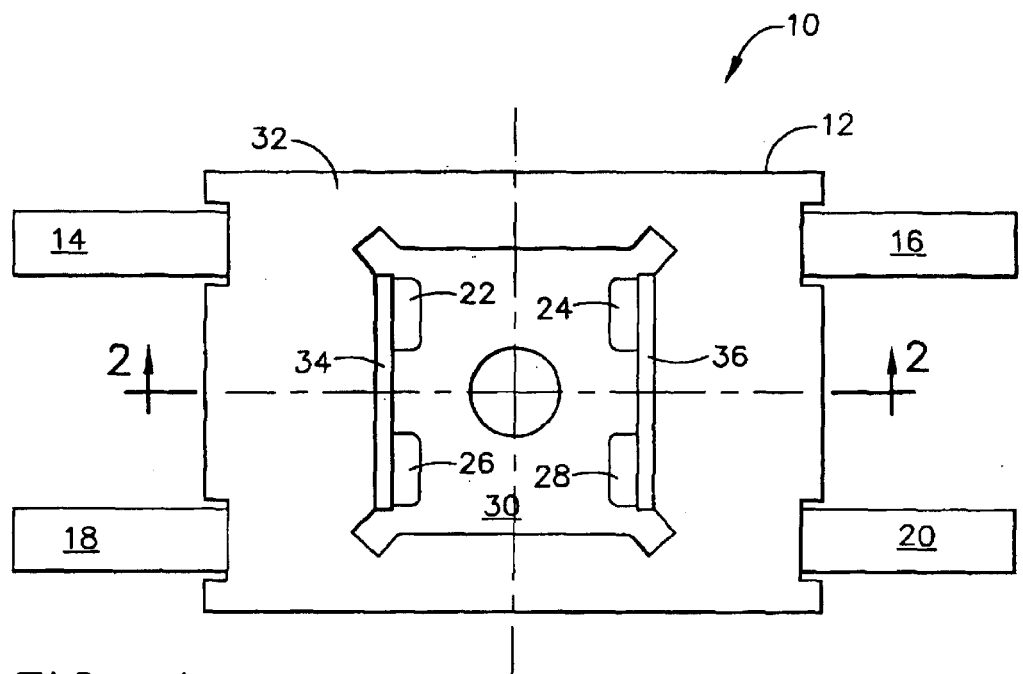
FIG. 1 illustrates a top view of a housing that supports a sensing element in accordance with the present invention.
Figure 2:
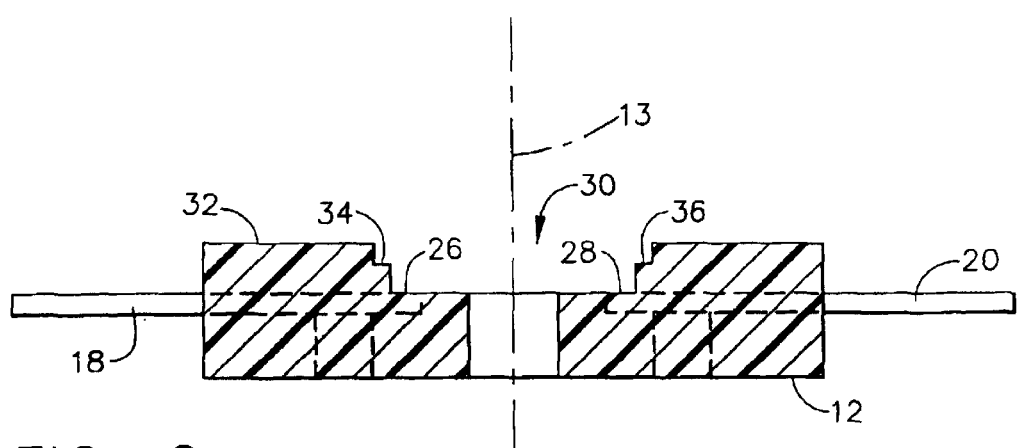
FIG. 2 illustrates a cross sectional side view of the housing of FIG. 1.

As shown in FIGS. 1 and 2, a sensor package 10 includes a housing 12 that may be fabricated from a suitable plastic, that has a center line 13, and that supports a plurality of terminals such as terminals 14, 16, 18, and 20, although other terminal arrangements can be provided. The terminals 14, 16, 18, and 20 are suitably coupled to corresponding connection pads 22, 24, 26, and 28 that are exposed in a well 30 formed through an upper surface 32 of the housing 12. Shelves 34 and 36 are formed in the housing 12 on each side of the well 30.

Instead of plastic, the housing 12 may be fabricated from other suitable non-conductive materials such as ceramics. In the case of a ceramic housing, the ceramic may be stepped and may carry thick film conductors.

Figure 3:
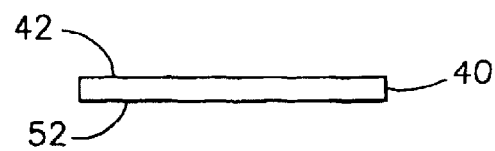
FIG. 3 illustrates a side view of a sensing element supported by the housing of FIGS. 1 and 2.
Figure 4:
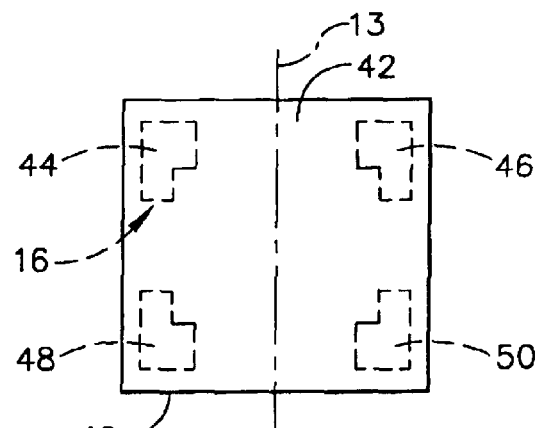
FIG. 4 illustrates a top view of the sensing element of FIG. 3.

A sensing element 40 is shown in FIGS. 3 and 4 and has an upper surface 42 and connection pads 44, 46, 48, and 50. The connection pads 44, 46, 48, and 50 are shown by dashed lines in FIG. 4 because the connection pads 44, 46, 48, and 50 are on a lower surface 52 of the sensing element 40. The connection pads 44, 46, 48, and 50 of the sensing element 40 are arranged in a pattern that matches the pattern of the connection pads 22, 24, 26, and 28 of the housing 12.

The sensing element 40, for example, may be supplied under part number PC 11367 or PC 11497 as a piezo resistive sensing element provided commercially by the assignee of the present invention. These sensing elements are sensor dies incorporating diaphragms. However, because of the shelves 34 and 36, the sensing element 40 may instead be a slab type sensing element machined or otherwise processed to a thickness which produces the proper response to an input force.

Figure 5:
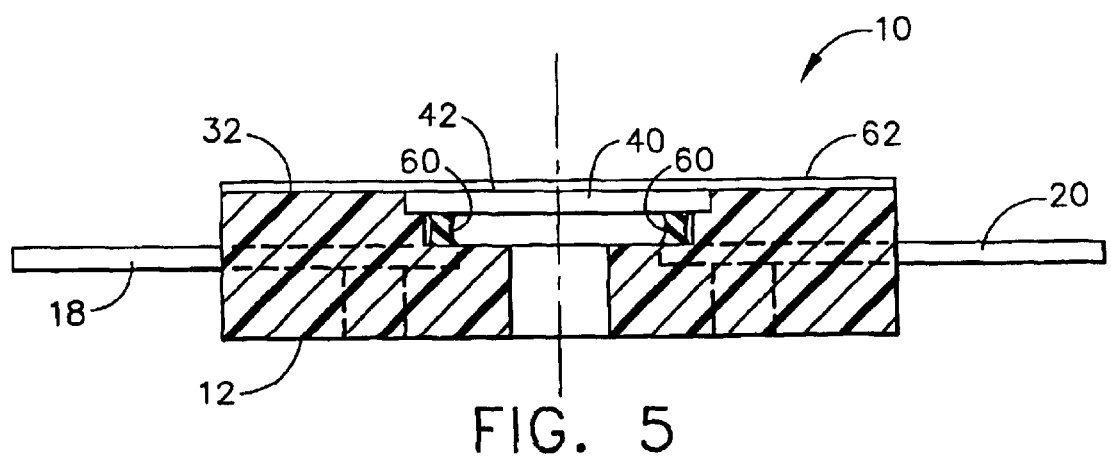
FIG. 5 illustrates a cross sectional side view of the sensing element and housing forming the sensor package of the present invention; and, FIGS. 6–8 illustrate alternative housings.

The depth of the shelves 34 and 36 are arranged to match the thickness of the sensing element 40 between its upper surface 42 and its lower surface 52 so that, as shown in FIG. 5, when the sensing element 40 is inserted into the well 30 until the sensing element 40 rests against the shelves 34 and 36, the upper surface 42 of the sensing element 40 and the upper surface 32 of the housing 12 are substantially coplanar. Moreover, the shelves 34 and 36 and the well 30 permit the sensing element to bend.

During assembly of the sensor package 10, a dollop 60 of conductive adhesive is placed on each of the connection pads 22, 24, 26, and 28 of the housing 12, and the sensing element 40 is oriented so that its connection pads 44, 46, 48, and 50 are aligned with, and face, the corresponding connection pads 22, 24, 26, and 28 of the housing 12. The sensing element 40 is then inserted into the well 30 until it rests against the shelves 34 and 36 at which point the connection pads 22, 24, 26, and 28 of the housing 12 are electrically coupled to their corresponding connection pads 44, 46, 48, and 50 of the sensing element 40 by the conductive adhesive which was applied to the connection pads 22, 24, 26, and 28.

Accordingly, the well 30 and the shelves 34 and 36 of the housing 12 serve to provide precise alignment of the sensing element 40. Also, as can be seen from FIG. 5, following such assembly, the upper surface 32 of the housing 12 and the upper surface 42 of the sensing element 40 lie in substantially the same plane. The well 30 has a clearance below the shelves 34 and 36 to accommodate the dollops 60 of the conductive adhesive. Accordingly, the well 30 provides the space for the conductive adhesive to expand. The tortuous path provided by the shelves 34 and 36 help prevent the conductive adhesive from working around the edge of the sensing element 40 so as to cause sensing element edge electrical shorting. The conductive adhesive provides the electrical connection between the connection pads 22, 24, 26, and 28 of the housing 12 and the corresponding connection pads 44, 46, 48, and 50 of the sensing element 40.

With this arrangement, the housing 12 may be applied so that the sensing element 40 directly senses the force that it is intended to sense without the need of an actuator between the source of this force and the sensing element 40. Also, this arrangement eliminates the need for protrusions and electrical connections on the upper surfaces 32 and 42 thereby permitting a totally planar surface.

Figure 6:
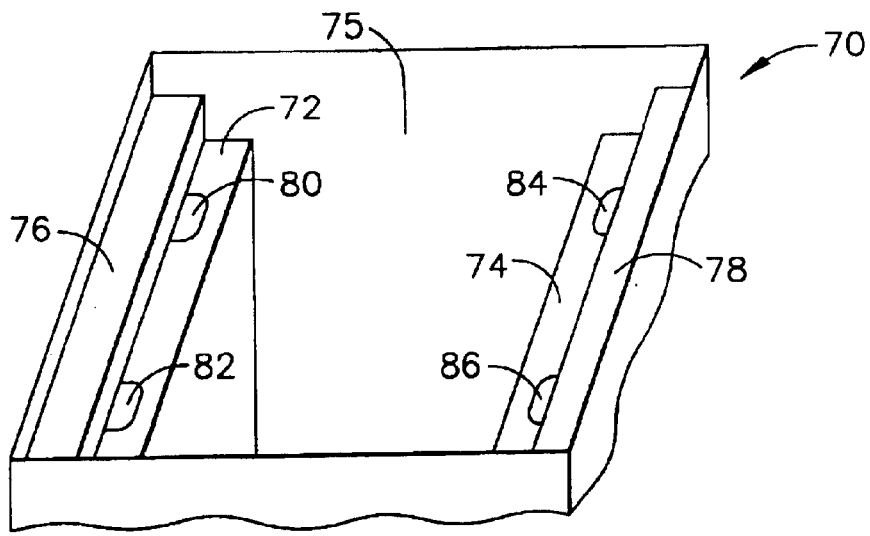

A housing 70 according to an alternative embodiment of the present invention is illustrated in FIG. 6. Shelves 72 and 74 are formed in the housing 70 on each side of a well 75, a ledge 76 is formed on the shelf 72, and a ledge 78 is formed on the shelf 74. The shelves 72 and 74 support connection pads 80, 82, 84, and 86 that are suitably coupled to corresponding terminals (not shown). The sensing element 40 is supported by the ledges 76 and 78, and the ledges 76 and 78 are arranged to provide a greater bending moment for the sensing element 40 in order to increase its sensitivity.

Figure 7:
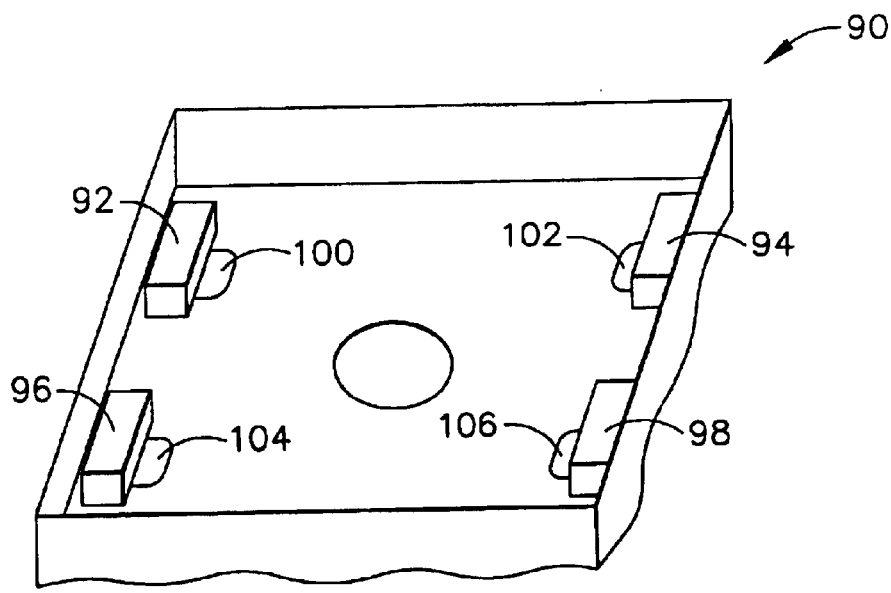

A housing 90 according to an another alternative embodiment of the present invention is illustrated in FIG. 7. Instead of forming two continuous shelves as previously described, the housing 90 is formed with multiple shelves such as mesas 92, 94, 96, and 98. Connection pads 100, 102, 104, and 106 are provided and are suitably coupled to corresponding terminals (not shown). The sensing element 40 is supported by the mesas 92, 94, 96, and 98. These mesas 92, 94, 96, and 98 further increase the sensitivity of the force sensor of the present invention.

Figure 8:
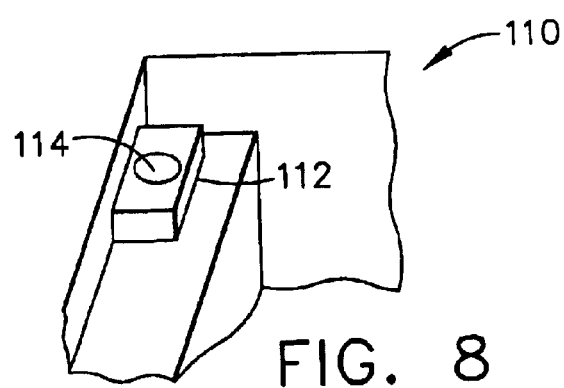

A housing 110 according to yet another alternative embodiment of the present invention is illustrated in FIG. 8. The housing 110 is formed with individual mesas such as a mesa 112. The mesa 112 is provided with an adhesive reservoir 114 to hold the dollop 60 of conductive adhesive for coupling a connection pad located beneath the mesa 112 to a corresponding connection pad on the sensing element 40. The other mesas may be provided with correspondingly similar adhesive reservoirs. Moreover, like adhesive reservoirs may be provided in the continuous shelves of the housing embodiment shown in FIGS. 1–5.

Certain modifications of the present invention have been discussed above. Other modifications will occur to those practicing in the art of the present invention. For example, in cases where the sensor package 10 requires electrical isolation and environmental protection, an optional membrane 62 shown in FIG. 5 may be added to the planar surface formed by the upper surface 32 of the housing 12 and by the upper surface 42 of the sensing element 40.

Moreover, the force sensor of the present invention can be used to sense any type of force such as stress.

Furthermore, instead of using the dollop 60 of conductive adhesive in order to couple a connection pad of a terminal to a corresponding connection pad on the sensing element, conductive tape could instead be used.

Additionally, as described above, the thickness of a sensing element and the depth of a shelf or mesa of a housing are controlled so that, when the sensing element is mounted to the housing, the upper surface of the sensing element and the upper surface of the housing are substantially coplanar. This construction permits the thickness of the sensing element to be controlled with respect to the depth of the shelf or mesa of the housing so that, when the sensing element is mounted to the housing, the upper surface of the sensing element protrudes somewhat above the upper surface of the housing, or so that the upper surface of the sensing element is somewhat depressed with respect to the upper surface of the housing.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A sensor package comprising:
   a housing having an upper housing surface and a well extending into the housing through the upper housing surface, wherein the upper housing surface defines a first plane; and,
   a force sensing element having an upper element surface and a lower element surface, wherein the upper element surface defines a second plane, wherein the force sensing element is supported by the housing such that the lower element surface is within the well and such that the first and second planes are coplanar, wherein the housing has a connection pad within the well, wherein the force sensing element has a connection pad, and wherein the connection pads of the housing and the force sensing element are electrically coupled when the force sensing element is supported by the shelf of the housing.

2. The sensor package of claim 1 wherein a conductive adhesive electrically couples the connection pads of the housing and the force sensing element.

3. The sensor package of claim 2 further comprising a membrane covering the upper surfaces of the housing and the force sensing element in order to provide electrical isolation of the sensor package.

4. The sensor package of claim 2 further comprising a membrane covering the upper surfaces of the housing and the force sensing element in order to provide environmental protection for the sensor package.

5. The sensor package of claim 2 wherein the shelf has an adhesive reservoir to hold the conductive adhesive.

6. The sensor package of claim 2 wherein the shelf is arranged to prevent the conductive adhesive from migrating around an edge of the force sensing element and causing the force sensing element to electrically short.

7. A sensor package comprising:
a housing having an upper housing surface and a well extending into the housing through the upper housing surface, wherein the upper housing surface defines a first plane; and,
a force sensing element having an upper element surface and a lower element surface, wherein the upper element surface defines a second plane, wherein the force sensing element is supported by the housing such that the lower element surface is within the well and such that the first and second planes are coplanar, wherein the housing has a connection pad, wherein the force sensing element has a connection pad, and wherein the connection pads of the housing and the force sensing element are electrically coupled.

8. The sensor package of claim 7 wherein a conductive adhesive electrically couples the connection pads of the housing and the force sensing element.

9. The sensor package of claim 8 further comprising a membrane covering the upper surfaces of the housing and the force sensing element in order to provide electrical isolation of the sensor package.

10. The sensor package of claim 8 further comprising a membrane covering the upper surfaces of the housing and the force sensing element in order to provide environmental protection for the sensor package.

11. The sensor package of claim 8 wherein the conductive adhesive is held in an adhesive reservoir of the housing.

12. The sensor package of claim 7 further comprising a membrane covering the upper surfaces of the housing and the force sensing element in order to provide electrical isolation of the sensor package.

13. The sensor package of claim 7 further comprising a membrane covering the upper surfaces of the housing and the force sensing element in order to provide environmental protection for the sensor package.

14. A sensor package comprising:
a housing having an upper housing surface, a well extending into the housing through the upper housing surface, and a shelf; and,
a force sensing element having an upper element surface, wherein the force sensing element is supported by the shelf of the housing such that the force sensing element extends into the well, such that the upper housing surface and the upper element surface are coplanar, and such that the upper element surface and the upper housing surface face outwardly from the housing, wherein the housing has a connection pad within the well, wherein the force sensing element has a connection pad, and wherein the connection pads of the housing and the force sensing element are electrically coupled together.

15. The sensor package of claim 14 wherein a conductive adhesive electrically couples the connection pads of the housing and the force sensing element.

16. The sensor package of claim 15 wherein the shelf is arranged to prevent the conductive adhesive from migrating around an edge of the force sensing element and causing the force sensing element to electrically short.

17. The sensor package of claim 15 wherein the shelf has an adhesive reservoir to hold the conductive adhesive.

18. The sensor package of claim 14 further comprising a membrane covering the upper surfaces of the housing and the force sensing element in order to provide electrical isolation of the sensor package.

19. The sensor package of claim 14 further comprising a membrane covering the upper surfaces of the housing and the force sensing element in order to provide environmental protection for the sensor package.

20. A method of packaging a force sensing element, wherein the force sensing element has an outwardly facing element surface, wherein the outwardly facing element surface has an edge therearound, and wherein the method comprises:
a) applying the force sensing element to a housing part having an outwardly facing housing surface so that the edge of the outwardly facing element surface abuts an edge of the outwardly facing housing surface; and,
b) attaching the force sensing element to the housing part, wherein the housing part has a connection pad, wherein the force sensing element has a connection pad, and wherein the attaching of the force sensing element to the housing part comprises adhesively binding the connection pads of the housing part and the force sensing element together so that the force sensing element is attached to the housing part and so that the connection pads of the housing part and the force sensing element are electrically coupled together.

21. A method of packaging a force sensing element, wherein the force sensing element has an outwardly facing element surface, wherein the outwardly facing element surface has an edge therearound, and wherein the method comprises:
a) applying the force sensing element to a housing part having an outwardly facing housing surface so that the edge of the outwardly facing element surface abuts an edge of the outwardly facing housing surface;
b) attaching the force sensing element to the housing part; and,
covering the outwardly facing surfaces of the housing part and the force sensing element with a membrane in order to provide electrical isolation of the force sensing element.

22. A sensor package comprising:
a housing having an upper housing surface and a well extending into the housing through the upper housing surface, wherein the upper housing surface defines a first plane; and,
a force sensing element having an upper element surface and a lower element surface, wherein the upper element surface defines a second plane, wherein the force sensing element is supported by the housing such that the lower element surface is within the well and such that the first and second planes are coplanar; and,
covering the outwardly facing surfaces of the housing part and the sensing element with a membrane in order to provide environmental protection for the force sensing element.

* * * * *